US007709074B2

(12) United States Patent
Uchida et al.

(10) Patent No.: US 7,709,074 B2
(45) Date of Patent: May 4, 2010

(54) OPTICAL INFORMATION RECORDING MEDIUM, METHOD OF MANUFACTURING THE SAME, AND SURFACE PRINT METHOD

(75) Inventors: Mamoru Uchida, Gunma (JP); Takanobu Matsumoto, Gunma (JP); Tomonori Endo, Gunma (JP); Yuaki Shin, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 1010 days.

(21) Appl. No.: 11/356,635

(22) Filed: Feb. 17, 2006

(65) Prior Publication Data

US 2006/0204705 A1 Sep. 14, 2006

(30) Foreign Application Priority Data

| | | |
|---|---|---|
| Feb. 18, 2005 | (JP) | 2005-041861 |
| Feb. 18, 2005 | (JP) | 2005-041921 |
| Feb. 18, 2005 | (JP) | 2005-041957 |

(51) Int. Cl.
*B32B 3/02* (2006.01)

(52) U.S. Cl. .................... 428/64.1; 428/64.4; 430/270.1

(58) Field of Classification Search ................ 428/64.1, 428/64.4; 340/270.11

See application file for complete search history.

(56) References Cited

U.S. PATENT DOCUMENTS

| | | | | |
|---|---|---|---|---|
| 5,616,450 | A | 4/1997 | Arai et al. | |
| 5,798,161 | A * | 8/1998 | Kita et al. | 428/64.1 |
| 5,982,737 | A * | 11/1999 | Takagishi et al. | 369/275.1 |
| 6,735,166 | B1 * | 5/2004 | Kusafuka et al. | 369/275.3 |
| 2005/0064114 | A1 * | 3/2005 | Matsubaguchi et al. | 428/32.24 |
| 2006/0165905 | A1 * | 7/2006 | Ose et al. | 427/377 |
| 2006/0182875 | A1 * | 8/2006 | Ose et al. | 427/58 |

FOREIGN PATENT DOCUMENTS

| | | | |
|---|---|---|---|
| EP | 1022316 | A1 | 7/2000 |
| EP | 1450359 | A2 | 8/2004 |
| EP | 1519369 | A1 | 3/2005 |

(Continued)

*Primary Examiner*—Elizabeth Mulvaney
(74) *Attorney, Agent, or Firm*—Law Office of Katsuhiro Arai

(57) ABSTRACT

There is provided an optical information recording medium which can meet opposite requirements of enhancement in ink absorption and fixation properties of an image forming layer and suppression and prevention of solid attachment of a printed portion, which has excellent printability to obtain high image quality and an excellent holding property of the printed portion, and which little makes the solid attachment on the printed surface layer occur. At this time, a thick layer can be formed even by the use of a coating solution for the image forming layer. The optical information recording medium has the image forming layer on various layers stacked on a surface of a light transmitting substrate and optically readable signals are recorded or can be recorded therein by the use of laser beams incident on the other surface of the light transmitting substrate, wherein the image forming layer includes an ink absorbing porous layer made of a resin layer containing vapor inorganic particles. A hydrophobic portion is formed in a portion beside the porous layer on the surface of a layer adjacent to the porous layer. An anchor layer is disposed under the porous layer.

12 Claims, 6 Drawing Sheets

FOREIGN PATENT DOCUMENTS

| | | | |
|---|---|---|---|
| EP | 1519370 | A1 | 3/2005 |
| EP | 1450359 | A3 | 8/2006 |
| JP | 2004-216614 | | 8/2004 |
| JP | 2004-249610 | | 9/2004 |
| WO | WO 2006/070915 | A1 | 7/2006 |

* cited by examiner

OPTICAL INFORMATION RECORDING MEDIUM, METHOD OF MANUFACTURING THE SAME, AND SURFACE PRINT METHOD

BACKGROUND OF THE INVENTION

1. Field of the Invention

The field relates to an optical information recording medium on which optically reproducible information is recorded or can be recorded, and more particularly, to an optical information recording medium having an image forming layer on which an image can be formed with aqueous ink with a recording layer therebetween on the surface of a substrate opposite to an incident surface on which recording light and reproduction light are incident, in which display performance with aqueous ink on the image forming layer.

2. Description of the Related Technology

In these days, CDs (Compact Discs) are spread in the field of audio and CD-ROMs are widely used as optical media for storing data with spread of PCs (Personal Computers). Further, with development and practical use of short-wave laser, DVDs (Digital Versatile Discs) allowing recording and reproduction of data with a higher density are widely used and with development and practical use of shorter-wave laser such as blue laser, optical disks corresponding to a HD DVD standard or a Blu-ray standard allowing recording and reproduction of data with a higher density are spread. As the DVDs, there is known a DVD-ROM for computer data, in addition to a digital video disk for video image. In the near future, a DVD dedicated to music is going to come to the market.

The CD or CD-ROM has a structure that a light transmitting substrate, which is a donut-shaped disk made of resin such as polycarbonate, is coated with gold or aluminum to form a reflection layer and is covered with a protection layer made of UV-curable resin or the like. In order to record data thereon, uneven pit lines are formed in a spiral arrangement on the surface of the light transmitting substrate. The pit lines are formed in advance at the time of forming the light transmitting substrate along a mold such as a stamp and the reflection layer is formed thereon.

The DVD or DVD-ROM has the same basic structure as the CD or CD-ROM. The thickness of the light transmitting substrate is a half of that of the CD and thus by bonding two sheets of light transmitting substrates having the half thickness, the total thickness of the disk is equal to that of the CD. For example, in a one-sided DVD or DVD-ROM, uneven pit lines are formed on one substrate, the reflection layer is formed thereon, and then another substrate not having the pit lines and the reflection layer is bonded thereto.

In addition to the CDs or DVDs on which data are recorded in advance by the use of the pit lines, optical information recording mediums such as CD-R, CD-RW, DVD-R, and DVD-RW on which data can be recorded after optical information recording mediums are manufactured are developed and used.

As such an optical information recording medium, there is developed an optical information recording medium on which an image can be printed with aqueous ink by the use of an aqueous ink pen or an inkjet printer, by forming an ink receiving layer for receiving aqueous ink on various layers such as a recording layer on the surface of the light transmitting substrate opposite to the surface on which recording light or reproduction light is incident. In the optical information recording medium, the ink receiving layer for fixing the aqueous ink on the surface of a protection layer or the surface of the bonded substrate.

Such a related art is disclosed in Japanese Unexamined Patent Application Publication No. 2004-216614.

Color print with high image quality is performed much by the use of inkjet printers. The color print is performed by jetting a plurality of color droplets to pixels of the ink receiving layer from an ink nozzle and adjusting colors and concentrations through the combination of colors or the amount of jetted inks. In this case, in order to obtain natural and good coloring, it is required that a plurality of ink colors jetted to the pixels are rapidly absorbed and fixed to the ink receiving layer without being mixed. In addition, in order to improve a water-resistant property such that solid attachment or thinning on the printed image could be prevented or the printed image could not be damaged due to moisture in air or moisture of a hand handling the optical information recording medium, it is necessary that the ink jetted onto the surface of the ink receiving layer is absorbed into and fixed to the ink receiving layer.

In order to accomplish rapid absorption and fixation of the aqueous ink into the ink receiving layer, the hydrophilic property of the ink receiving layer should be enhanced. However, in this case, it is also easy for the ink receiving layer to absorb the moisture of a hand or the moisture in air, so the solid attachment can easily occur. Accordingly, for example, when the optical information recording mediums are stacked for storage, the upper and lower ones are bonded to each other, thereby damaging the display quality and making the handling thereof difficult. The printed portion with the ink is blurred by the absorption of the moisture and the ink holding property is deteriorated, thereby reducing the durability of the print quality.

For these reasons, it is difficult to embody high image quality such as image quality of a photograph by allowing the opposite requirements of enhancement in ink absorption property of the ink receiving layer and the prevention of the solid attachment to be compatible with each other.

SUMMARY OF THE INVENTION

An object of the invention is to provide an optical information recording medium which can satisfy opposite requirements of enhancement in ink absorption and fixation properties of an image forming layer and suppression and prevention of solid attachment of a printed portion, which has excellent printability to obtain high image quality and an excellent holding property of the printed portion, and which little makes the solid attachment on the printed surface layer occur.

The inventors of the invention found out the following facts and thus contrived the invention, as a result of studies for solving the above-mentioned problems. That is, a resin layer containing vapor alumina obtained by oxidizing aluminum in vapor phase could form a porous layer having a plurality of pores and ink could be absorbed, held, and fixed in the pores, thereby suppressing and preventing the ink from staying on the surface of the porous layer. In this case, by forming a hydrophobic portion on a layer adjacent to the porous layer, a coating solution for forming the porous layer is coated by the use of a spin coating method and is returned from the hydrophobic portion, so the coating solution could not be thrown out due to a centrifugal force and thus a relatively thick layer was formed. That is, a thick layer could be obtained even out of a coating solution with a relatively low viscosity. When a porous layer having a plurality of pores is formed and an anchor layer is formed under the porous layer, the ink is absorbed in the pores but ink can be absorbed and fixed in the anchor layer by increasing the amount of ink passing through the porous layer. Accordingly, the ink could be suppressed and prevented from staying on the surface of the porous layer.

According to an aspect of the invention, there is provided an optical information recording medium which has an image forming layer on various layers stacked on a surface of a light transmitting substrate and in which optically readable signals are recorded or can be recorded by the use of laser beams incident on the other surface of the light transmitting substrate, wherein the image forming layer includes an ink absorbing porous layer made of a resin layer containing vapor inorganic particles.

According to another aspect of the invention, there is provided an optical information recording medium which has an image forming layer on various layers stacked on a surface of a light transmitting substrate and in which optically readable signals are recorded or can be recorded by the use of laser beams incident on the other surface of the light transmitting substrate, wherein the image forming layer includes an ink absorbing porous layer and a hydrophobic portion is formed in a portion beside the porous layer on the surface of a layer adjacent to the porous layer. The layer adjacent to the porous layer may be made of a hydrophobic material and the hydrophobic portion may be a margin region when the layer adjacent to the porous layer is formed by the use of a screen print method. The substrate may be made of poly carbonate, an inner circumferential edge and an outer circumferential edge of the substrate may be non-coated portions, and the hydrophobic portion may be formed in the inner circumference and the outer circumference non-coated. The ink absorbing porous layer may have an aqueous ink absorbing property. The image forming layer may have an anchor layer along with the porous layer, the layer adjacent to the porous layer may be the anchor layer, and the anchor layer may be a hydrophilic anchor layer made of a hydrophilic resin layer.

According to another aspect of the invention, there is provided an optical information recording medium which has an image forming layer on various layers stacked on a surface of a light transmitting substrate and in which optically readable signals are recorded or can be recorded by the use of laser beams incident on the other surface of the light transmitting substrate, wherein the image forming layer includes an ink absorbing porous layer and an anchor layer under the porous layer. The uppermost layer of the stacked layers is a coloring layer and the anchor layer may be disposed between the coloring layer and the porous layer. An outer diameter of the porous layer may be larger than an outer diameter of the anchor layer. Expansion and contraction of the porous layer due to addition and removal of heat or a solvent may be larger than that of the anchor layer. Smoothness of the anchor layer may be higher than that of the porous layer. The porous layer may contain inorganic particles, the boundary between the porous layer and the anchor layer is fused, and the porous layer may have a concentration of the inorganic particles increasing toward the surface. The porous layer may have a light transmitting property. The anchor layer may be a hydrophilic anchor layer made of hydrophilic resin.

According to another aspect of the invention, there is provided a method of manufacturing an optical information recording medium which has an image forming layer on various layers stacked on a surface of a light transmitting substrate and in which optically readable signals are recorded or can be recorded by the use of laser beams incident on the other surface of the light transmitting substrate, wherein the image forming layer includes a porous layer obtained by forming a film out of a coating solution containing vapor inorganic particles and a resin material by the use of a spin coating method. The viscosity of the coating solution may be in the range of 300 to 14,000 mPa·s (25° C.). The thickness of the formed porous layer may be in the range of 5 to 100 μm.

According to another aspect of the invention, there is provided a method of manufacturing an optical information recording medium which has an image forming layer on various layers stacked on a surface of a light transmitting substrate and in which optically readable signals are recorded or can be recorded by the use of laser beams incident on the other surface of the light transmitting substrate, wherein the image forming layer includes a porous layer obtained by forming a film out of a coating solution containing a hydrophilic resin material by the use of a spin coating method, and a hydrophobic portion is formed on the surface beside the porous layer in a layer adjacent to the porous layer, and wherein diffusion of the coating solution is suppressed and prevented by the hydrophobic portion and the coating solution is returned reversely in the diffusion direction when the coating solution is applied by the use of the spin coating method, thereby forming the porous layer. The viscosity of the coating solution may be in the range of 300 to 14,000 mPa·s (25° C.). The thickness of the formed porous layer may be in the range of 5 to 100 μm.

According to another aspect of the invention, there is provided a method of manufacturing an optical information recording medium which has an image forming layer on various layers stacked on a surface of a light transmitting substrate and in which optically readable signals are recorded or can be recorded by the use of laser beams incident on the other surface of the light transmitting substrate, wherein the image forming layer includes an anchor layer obtained by forming a film out of a coating solution containing a resin material and a porous layer obtained by forming a film on the anchor layer out of a coating solution containing a resin material equal to or different from the resin material of the anchor layer.

According to another aspect of the invention, there is provided a method of performing a print work on the surface of an optical information recording medium which has an image forming layer on various layers stacked on a surface of a light transmitting substrate, the method comprising: preparing the optical information recording medium of which the image forming layer includes an ink absorbing porous layer containing vapor inorganic particles; attaching ink, which electrically attracts the vapor inorganic particles, to the surface of the image forming layer by the use of an inkjet printing method; and performing a print work by allowing the image forming layer to absorb the ink.

Since the image forming layer has the porous layer, it is possible to rapidly absorb and fix the ink. On the other hand, since the ink little remains on the surface due to the absorption, it is possible to suppress and prevent the solid attachment onto the surface. That is, it is possible to satisfy the requirement for enhancing both opposite performances of which one goes worse while the other goes better. Accordingly, it is possible to provide an optical information recording medium which can form an image with high quality, in which printability such as a coloring property of print is excellent, a quality holding property of a printed image is excellent, and blur due to moisture in air little occurs.

In this case, by forming the hydrophobic portion on the layer adjacent to the porous layer, the coating solution for forming the porous layer is coated by the use of a spin coating method and is returned from the hydrophobic portion, so the coating solution is not thrown out due to a centrifugal force and thus a relatively thick layer is formed. That is, a thick layer can be obtained even out of a coating solution with a relatively low viscosity. Accordingly, the coating solution can be easily manufactured, thereby contributing reduction in cost and enhancement in workability.

When the image forming layer has the porous layer and the anchor layer, it is possible to rapidly absorb and fix the ink. On the other hand, since the ink is surely absorbed in and transmitted by the porous layer and thus the ink little remains on the surface, it is possible to suppress and prevent the solid attachment onto the surface. That is, it is possible to satisfy the requirement for enhancing both opposite performances of which one goes worse while the other goes better. Accordingly, it is possible to provide an optical information recording medium which can form an image with high quality, in which printability such as a coloring property of print is excellent, a quality holding property of a printed image is excellent, and blur due to moisture in air little occurs.

DETAILED DESCRIPTION OF CERTAIN EMBODIMENTS

Figure 1:
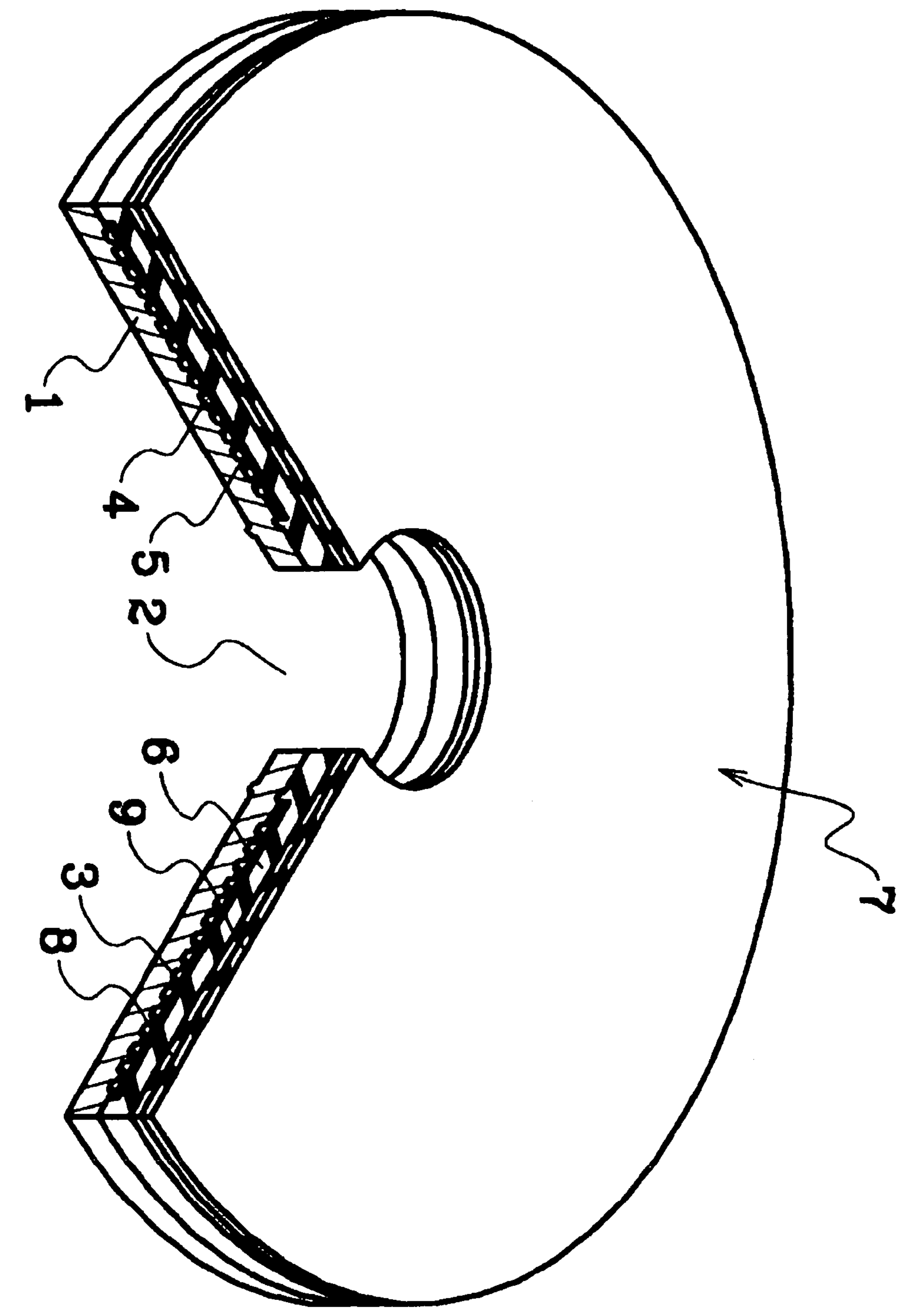
FIG. 1 is a partial sectional perspective view of an optical disk as an optical information recording medium according to an embodiment of the invention.
Figure 2:
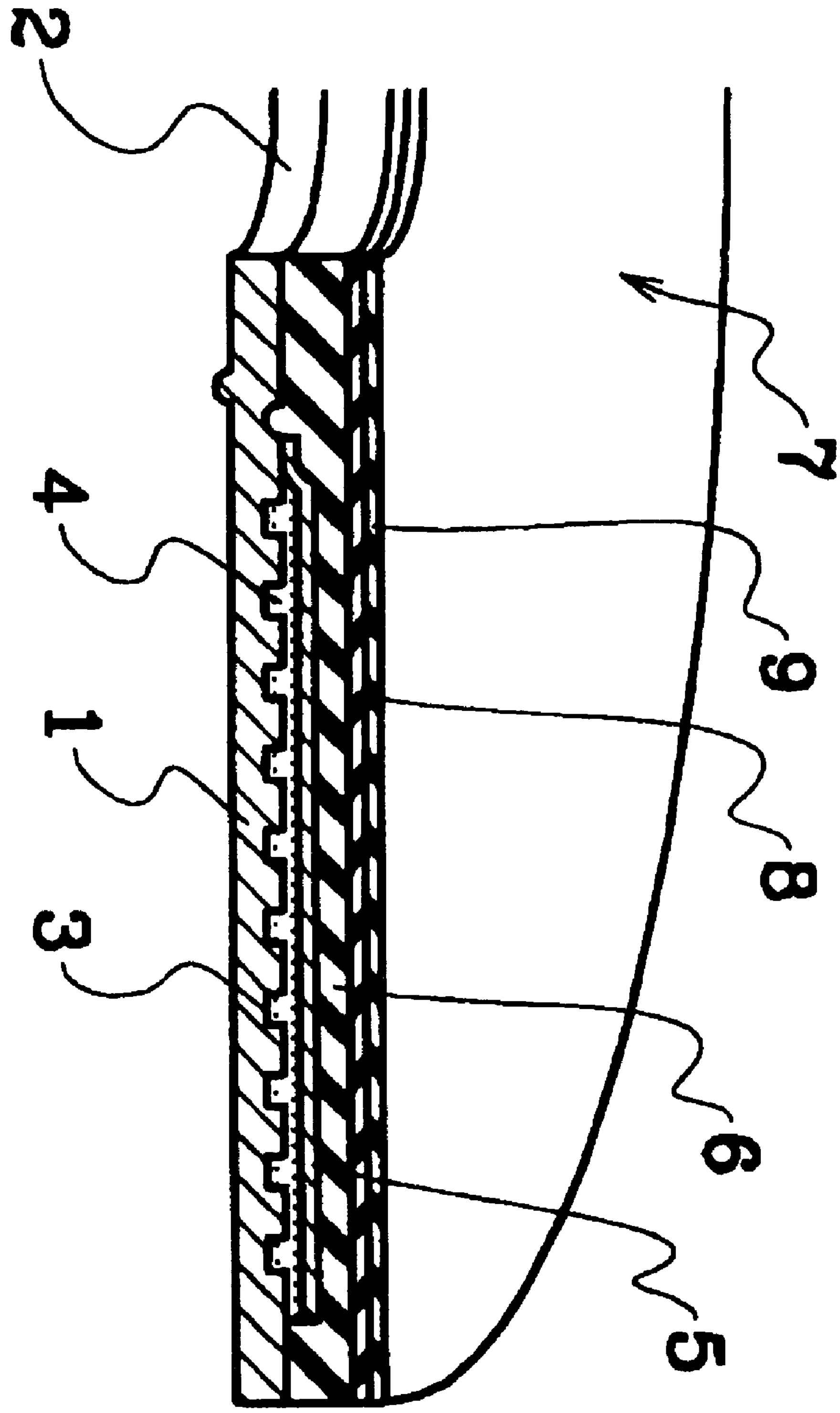
FIG. 2 is a longitudinal sectional perspective view illustrating a part of the optical disk.
Figure 3:
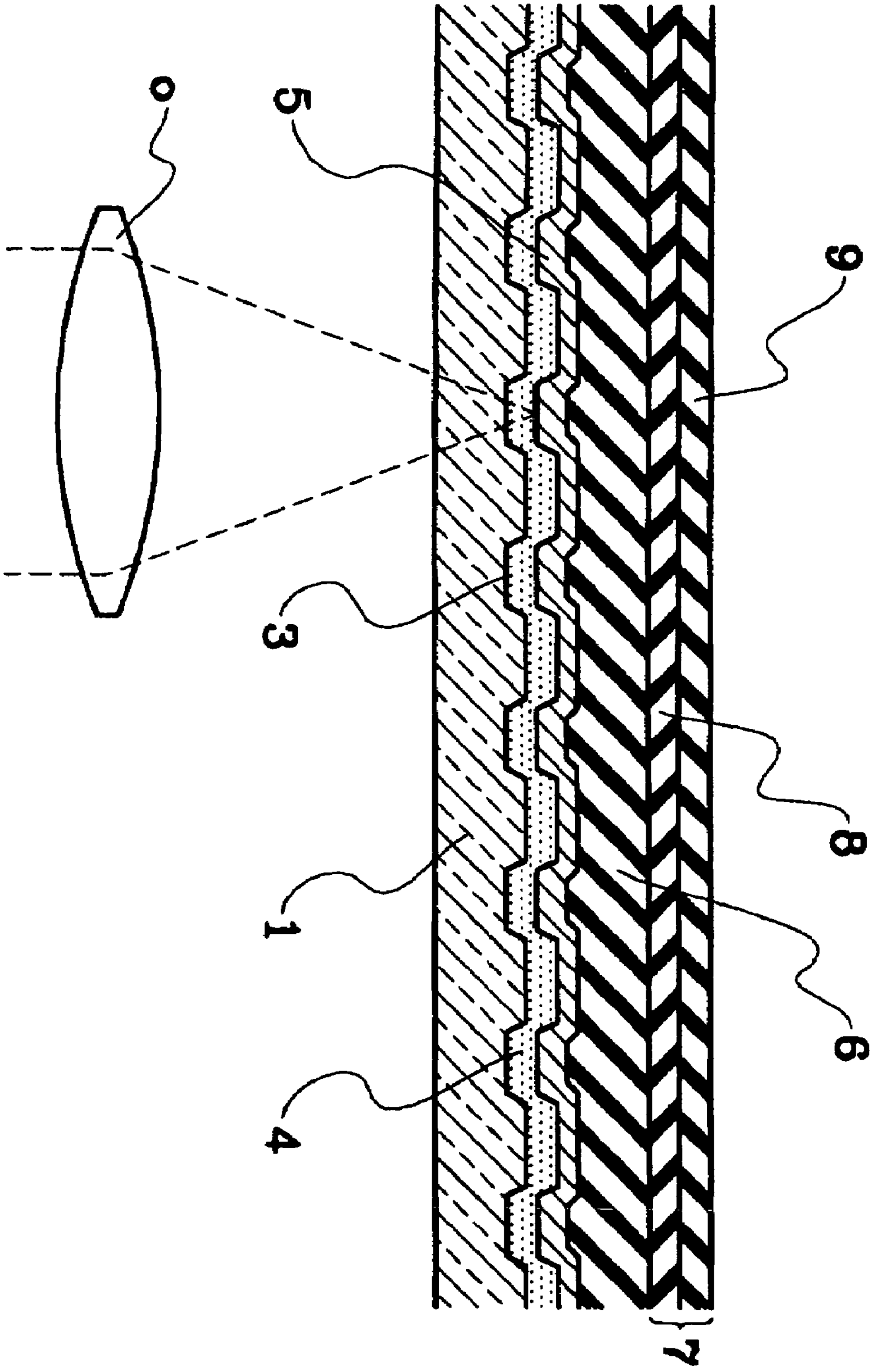
FIG. 3 is a longitudinal sectional perspective view illustrating an important part of the optical disk.

In an exemplary embodiment of a recordable optical information recording medium, as shown in FIGS. 1 to 3, a light transmitting substrate 1 is a transparent circular substrate having a center hole 2 at the center thereof and is generally formed by an injection molding method using transparent resin such as poly carbonate, poly methylmethacrylate (PMMA). A clamping area is disposed outside the center hole 2 on one surface of the light transmitting substrate 1 and the outer circumference portion of the clamping area serves as an information recording (data recording) area. Tracking guides 3 are formed in a group of spiral shapes in the data recording area. The pitch of the tracking guides 3 is about 1.6 μm in CD and 0.74 μm in DVD.

Next, the surface of the light transmitting substrate 1 on which the tracking guides 3 are formed is coated with coloring pigment as organic pigment such as cyanine pigment and methine pigment by the use of, for example, a spin coating method, thereby forming a recording layer 4 made of a pigment layer. A reflection layer 5 made of a single metal layer such as gold, aluminum, silver, copper, and palladium, or an alloy layer thereof, or a minor-component containing metal layer in which minor components are added to the single metal or the alloy thereof is formed on the recording layer 4. A protection layer 6 made of a UV-curable resin layer, which is obtained from UV-curable resin, is formed on the whole surface from the inner circumference to the outer circumference of the light transmitting substrate 1 so as to cover the reflection layer 5.

An image forming layer 7 is formed on the protection layer 6. The image forming layer 7 includes a coloring layer 8 as a lower layer and a porous layer 9 as an upper layer. It is preferable that the coloring layer 8 is colored with pigment or dyes. Specifically, the white coloring can cover the metal color of the lower layer and can improve the coloring property of ink passing through a porous layer 9 formed on the surface thereof, thereby making the color be visible. When the coloring layer 8 is not necessary, the image forming layer 7 may include only the porous layer 9.

The coloring layer 8 is formed through coating of a coating solution, which is obtained by adding particles of inorganic pigments such as powder silica, talc, mica, calcium carbide, titanium oxide, zinc oxide, colloidal silica, carbon black, and colcothar or organic materials such as carboxymethyl cellulose, dextrin, and methyl cellulose to a UV-curable resin material or other resin materials and adding a solvent thereto as needed.

The porous layer 9 is made of a porous film which is a coated film of a coating solution, the coating solution being obtained by adding vapor inorganic particles such as vapor alumina to the UV-curable resin material or other resin materials and adding other additives thereto. The vapor alumina is alumina particles (aluminum oxide particles) obtained by vaporizing aluminum chloride or metal aluminum and oxidizing the vaporized alumina by the use of oxidant gas and is so-called transition alumina having a crystal type of amorphous type, β type, γ type, δ type, or θ type. Similarly to the vapor alumina, vapor inorganic particles (vapor metal oxide particles) can be obtained from other inorganic materials. Specifically, the γ crystal type has a shape suitable for attachment of ink. Accordingly, when the γ crystal type of the alumina particles is used as the vapor inorganic particles and the porous layer includes the γ alumina particles, it is possible to rapidly absorb the ink.

The coating solution containing the vapor alumina (hereinafter, "vapor alumina" may be referred to as "vapor inorganic particles") can have viscosity higher than that of the coating layer obtained in the same way except for containing general wet alumina (aqueous inorganic particles) instead of the vapor alumina. Accordingly, the thickness of the coating layer formed by the use of a spin coating method can be increased. As a result, it is possible to absorb, hold, and fix the ink by the use of only the porous layer.

Examples of a resin material used for the coloring layer 8 or the porous layer 9 can include at least one out of polyethylene oxide, polyvinyl alcohol, polyvinyl methyl ether, polyvinyl formal, carboxyvinyl polymer, hydroxyethyl cellulose, hydroxypropyl cellulose, methyl cellulose, sodium carboxymethyl cellulose, and polyvinyl pyrrolidone and an additive such as a solvent is added thereto as needed. The coloring layer is mainly made of a UV-curable resin material and the porous layer is mainly made of a hydrophilic resin material which is UV-curable or heat-curable. As the UV-curable resin material, hydrophilic UV-curable resin obtained by mixing at least one of the above-mentioned resin materials, photopolymerization monomer, photopolymerization initiator, and other additives as needed can be used. By replacing the photopolymerization initiator with thermal polymerization initiator, the heat-curable resin material may be obtained. The viscosity is adjusted by adding a solvent thereto as needed, so as to complete the coating solution.

In order to form the porous layer 9, 200 to 2000 wt %, preferably, 500 wt % more or less (which is not a percentage of the sum, but a percentage of resin) of the vapor alumina is added to the hydrophilic resin material or other resin material and the viscosity of the coating solution is adjusted to 300 to 14,000 mPa·s, and more preferably 350 to 8,100 mPa·s, and most preferably 960 to 8,100 mPa·s (where a soluble solid (non-versatile) is 10 to 50 wt % and the viscosity is adjusted by a brook field B viscometer at a temperature of 25° C.). The thickness thereof is preferably 1 μm or more, preferably 5 to 100 μm, more preferably 4.0 to 32 μm, and most preferably 10 to 32 μm. In this case, a printed image is not blurred and thus it is advantageous in image quality. By adjusting the values in this way, the ink absorbing property can be enhanced by only forming the one-layered porous layer, so it is not necessary to repeatedly form the porous layer. Accordingly, it is possible to form a porous layer having excellent absorption and fixation ability for ink through only one-times coating.

An example of the method of forming the porous layer 9 can include a spin coating method, as well as a screen print method. In the screen print method, it is necessary to form the porous layer with some margin (a blank portion) from the inner and outer circumferences of a disk (substrate) in consideration of deviation of print. On the contrary, in the spin coating method, the porous layer can be formed on the whole surface of the disk by using the centrifugal force toward the outer circumference and using a suction means toward the inner circumference and thus it is advantageous for manufacture. However, since the thickness goes non-uniform depending upon the viscosity, a study for securing a predetermined thickness is required. In order to form the porous layer 9 according to one embodiment, since the viscosity of the coating solution can be increased and decreased by means of increase and decrease in the amount of vapor alumina particles added thereto and thus the thickness of the porous layer absorbing the ink can be accordingly adjusted, it is possible to prevent the ink from staying on the surface of the porous layer 9 and to absorb and fix the ink into the porous layer. Accordingly, it is possible to easily form a desired porous layer by the use of the spin coating method without damaging the image quality of the printed image. In addition, the smoothness of the porous layer can be maintained by the use of the spin coating method.

Figure 5:
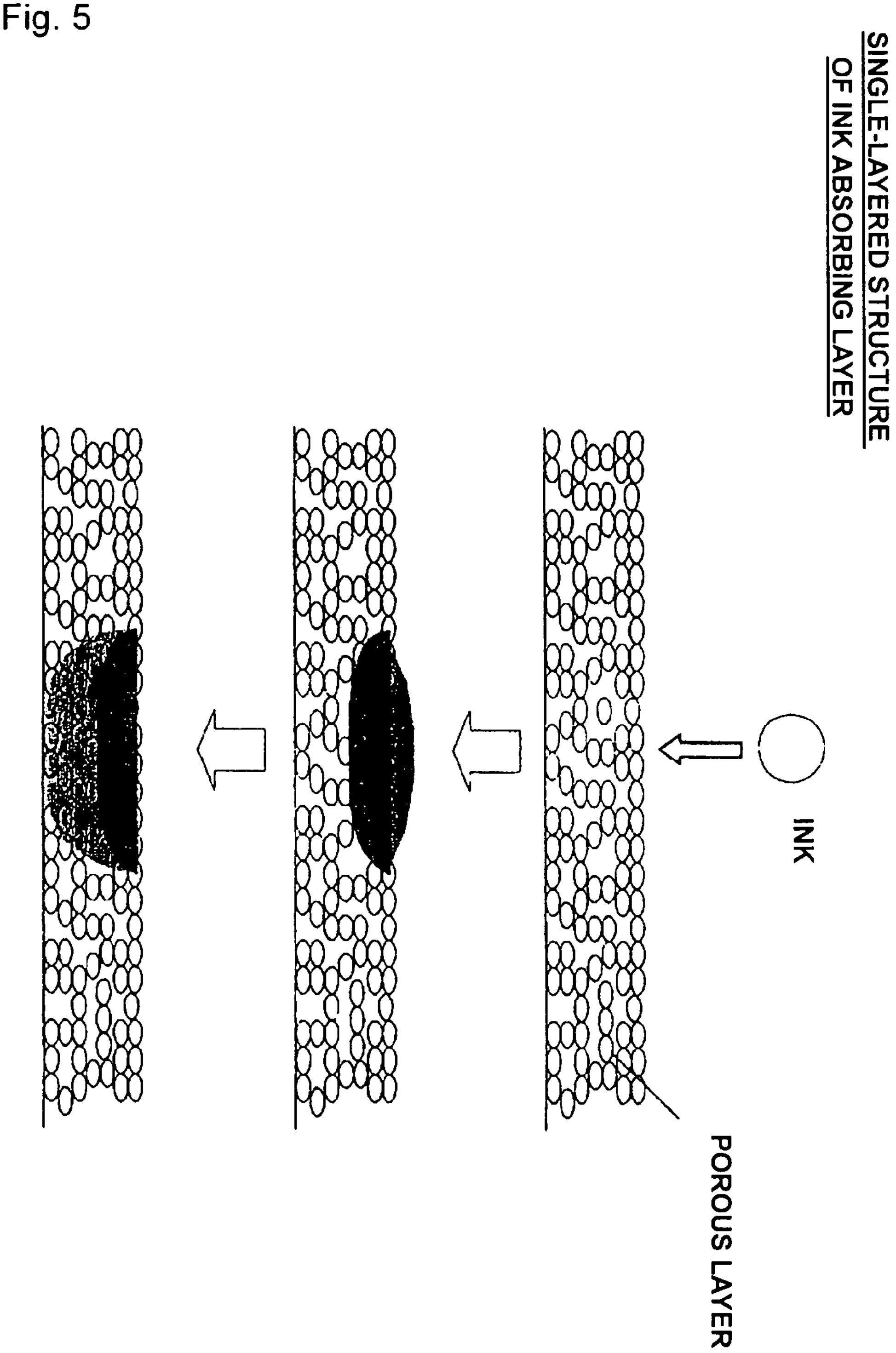
FIG. 5 is a schematic diagram illustrating a one-layered structure of a porous layer according to another embodiment of the invention.

As shown in FIG. 5, pores are formed in the porous layer and the ink is absorbed (as if a sponge absorbs water), held, and fixed to the pores. The pores are formed because resin is contracted to form voids between the vapor alumina particles in the course of drying the coating layer or in the course of curing curable resin.

Specifically, the vapor alumina particles have plus charges in the state that a layer is manufactured. As for the vapor alumina particles, ink having minus charges is used as ink for an inkjet method. When the ink is attached to the porous layer including the vapor alumina particles, the alumina particles and the ink electrically attract each other, thereby keeping the ink in the porous layer.

The porous layer 9 absorbs and fixes the ink so as to prevent the ink from staying on the surface thereof. Accordingly, a resin layer containing vapor alumina particles, which has such a hydrophilic property for fixation, may be used, in which the ink is permeated in the porous layer and little stays on the surface thereof so that the ink is not blurred with a touch of a finger 30 minutes after dropping aqueous ink. That is, a layer to which the ink is fixed to such an extent that the ink is not easily removed, not merely attached to the layer through drying the ink, is preferable.

In this way, it can be determined whether the porous layer 9 (image forming layer) has water-resistance.

The ink printed on the surface of the porous layer 9 is absorbed in the porous layer without decrease in contact area from the surface.

In the porous layer, as the resin layer contains a more amount of vapor alumina, the viscosity of the surface becomes less and the ink less stays on the surface. Accordingly, when an optical information recording medium is stacked to come in contact with the porous layer, they are not bonded to each other.

Figure 6:
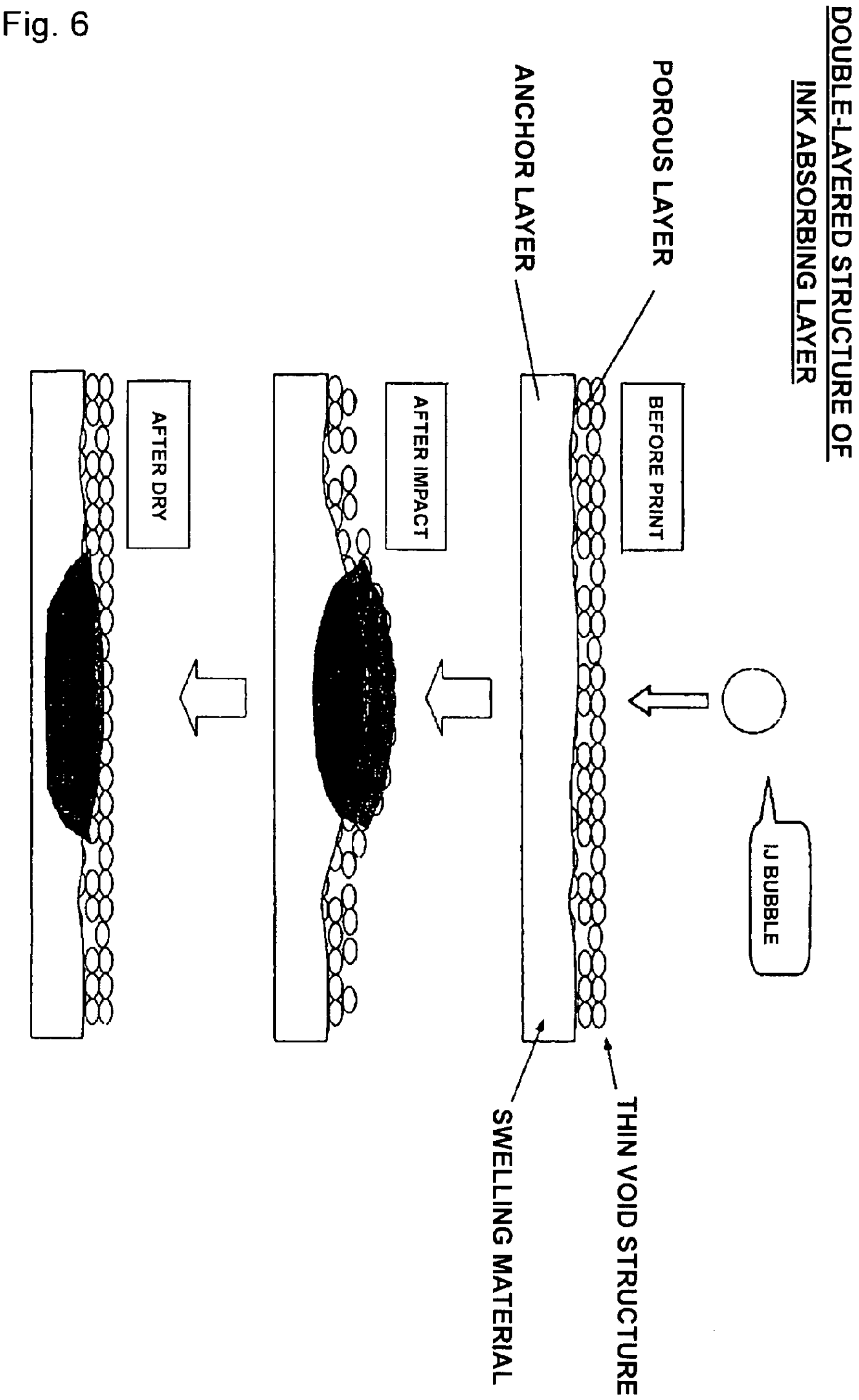
FIG. 6 is a schematic diagram illustrating a two-layered structure of a porous layer and an anchor layer according to another embodiment of the invention.

As shown in FIG. 6, the image forming layer 7 may have a two-layered structure of a porous layer similar to the porous layer 9 and an anchor layer. In this case, the porous layer serves to rapidly transmit the aqueous ink applied to the surface and to transport the aqueous ink to the anchor layer and the anchor layer fixes the transported ink. That is, the ink transmission and fixation functions can be distributed, so the extra ink not absorbed in the porous layer is absorbed in the anchor layer. When the porous layer serves to only transmit the ink, the ink can be suppressed from staying on the surface and thus different colors of the ink are not mixed with each other on the surface of the porous layer, thereby obtaining excellent colors. In addition, since the printed image is not blurred with a touch or a scrub of a finger and the ink little stay on the surface of the porous layer even with absorption of moisture in air, the ink is not blurred and thus preventing the printed image from being deformed. It is preferable that the porous layer is made of a porous film having minute pores so as to facilitate the absorption of ink. For example, a resin film containing the vapor alumina can be used with a small thickness. In this case, the thickness and the viscosity may not be in the above-mentioned ranges. As shown in FIG. 6, when the porous layer is a thin film having a porous structure and the anchor layer is hydrophilic (made of a swelling material), "IJ bubbles" (inkjet bubbles) (which may be another ink) are absorbed and transmitted by the porous layer and reaches the anchor layer to swell the anchor layer. The amount of swelling is large when there is only the anchor layer without the porous layer, but in one embodiment, the amount of swelling is small and the anchor layer is smoothed after dry, thereby making it difficult to blur the printed image.

The anchor layer is preferably a layer made of hydrophilic resin and more preferably a layer made of hydrophilic UV-curable resin. The layer made of hydrophilic UV-curable resin is manufactured by the use of a coating solution of hydrophilic UV-curable resin composition formed by mixing photopolymerization monomer, photopolymerization initiator, other additives if necessary, and at least one of hydrophilic resin such as polyethylene oxide, polyvinyl alcohol, polyvinyl methyl ether, polyvinyl formal, carboxyvinyl polymer, hydroxyethyl cellulose, hydroxypropyl cellulose, methyl cellulose, sodium carboxymethyl cellulose, polyvinyl pyrrolidone, ketone formaldehyde, styrene/anhydride maleate copolymer, shellac, dextrin, poly(acrylate pyrrolidonyl ethyl ester), poly acrylic acid and metal salt thereof, polyamine, polyacrylamide, polyethylene glycol, poly diethyl aminoethyl (meth)acrylamide, polyhydroxy styrene, polyvinyl alkyl ether, polyvinyl hydroxyl benzoate, poly phthalic acid, acetate cellulose hydroxyl diene phthalate, graft polymers such as LH-40 (made by Soken Chemical & Engineering Co., Ltd.) of which the main chain is methyl methacrylate and the branched chain is N-methylacrylamide, aqueous alkyd, aqueous polyester, aqueous polyepoxy, polyamide, polyvinyl methyl ether, saponified substance of poly acetic vinyl, carboxymethyl cellulose, sodium carboxymethyl cellulose, Arabic gum, guar gum, alginic acid soda. Examples of other hydrophilic resin can include at least one of the above-mentioned hydrophilic resins and the coating solution is manufactured by adding additive such as solvent as needed. The anchor layer made of a resin layer is formed by application of the coating solution.

In this way, when the image forming layer has the two-layered structure of the porous layer and the anchor layer, the anchor layer can be allowed to have a function of absorbing the remaining ink not absorbed into the porous layer and the fixation can be performed by the anchor layer, not by the porous layer. Accordingly, the thickness may be small and the porous layer may be formed by the use of the coating solution for the porous layer with a low viscosity including conventional aqueous alumina. Therefore, since it is no longer required to increase the viscosity to enhance the amount of coated solution and to form a thick layer, it is possible to reduce cost and to enhance workability.

In the two-layered structure of the porous layer and the anchor layer, it is preferable that a hydrophobic process is carried out to the surface of the anchor layer adjacent to the porous layer. In the hydrophobic process, the surface of the anchor layer is coated with a hydrophobic material such as fluorine compound or silicon compound to form a hydrophobic portion (hydrophobic layer). A part of the layer adjacent to the porous layer, for example, the surfaces of the inner and outer circumferences of the disk, may be formed in a rough surface. Specifically, when the porous layer is formed by the use of the spin coating method and the hydrophobic process is carried out to the portion of the surface of the anchor layer corresponding to the outer circumference of the disk (light transmitting substrate), the coating solution is returned to the inside from the hydrophobic portion (as if the solution is dammed up) at the time of diffusing the coating solution for forming the porous layer with the centrifugal force by the spin coating method, thereby preventing the coating solution from being thrown out of the disk. Accordingly, it is possible to secure a predetermined thickness by the use of a coating solution with a low viscosity for forming a porous layer.

When the anchor layer is formed by the use of the screen print method, a margin area is formed in the portion corresponding to the outer circumference of the disk. However, since the underlying layer is hydrophobic whether it is the protection layer made of UV-curable resin or a polycarbonate substrate bonded thereto, the margin portion can serve as a dam for preventing the diffusion of the coating solution for forming a porous layer due to the spin coating method.

In this way, when the coating solution for forming a porous layer stays in the vicinity of the outer circumference of the disk, the thickness of the coated layer can be made large, thereby securing the thickness in the outer circumference.

In order to form the two-layered structure of the porous layer and the anchor layer, the surface of the protection layer 6 is first coated with a coating solution including polyvinyl pyrrolidone (PVP), polyvinyl alcohol (PVA), and cellulose derivatives (where the above-mentioned hydrophilic resin can be used) and the coating solution is thermally dried to form a hydrophilic resin layer, which is used as the anchor layer. Alternatively, the surface of the protection layer 6 may be coated with a coating solution including a radiation-curable hydrophilic resin material such as methyl acrylamide (DMAA), 2-hydroxy ethylacrylate, and acrylamide derivatives (where the above-mentioned hydrophilic UV-curable resin compositions can be used) and the coating solution is cured by means of irradiation of UV as the radiation to form the UV-curable hydrophilic resin layer, which is used as the anchor layer. A small amount of fillers having a particle diameter of 0.1 to 50 μm as inorganic particles such as silica, alumina, and potassium carbide may be added to the hydrophilic resin layer or the UV-curable hydrophilic resin layer. Specifically, 5 to 10 wt % for resin may be added thereto. The thickness of the fixation layer is preferably 5 to 20 μm.

As the porous layer in the two-layered structure of the porous layer and the anchor layer, the anchor layer is coated with a coating solution obtained by dispersing filler particles in a resin binder and the coating solution is dried to form a pours layer made of a porous film having minute pores (voids). Inorganic particles such as silica, alumina, and potassium carbide having a particle diameter of 5 to 500 nm are used as the filler. Resin (where the above-mentioned hydrophilic resin and the hydrophilic UV-curable resin can be used) such as polyvinyl alcohol, polyvinyl butyral, and poly ethylene glycol is used as the resin binder and the coating solution is obtained by uniformly dispersing 1 to 30 times filler in the resin binder.

In the formed porous layer, as shown in FIG. 6, minute voids, that is, minute pores, are formed between the dispersed fillers by means of contraction of the resin binder at the time of drying. The minute pores serves to absorb and transmit the aqueous ink applied to the surface of the porous layer with a capillary phenomenon and to send the aqueous ink to the underlying anchor layer.

In the two-layered structure of the porous layer and the anchor layer, the following advantages can be obtained in addition to the advantages of the one-layered structure of the porous layer. That is, when the hydrophilic anchor layer is formed, specifically, when the underlying layer is made of hydrophilic resin not including the fillers such as the UV-curable resin, the adhesive power thereto is excellent rather than when the porous layer including vapor inorganic particles is formed as the underlying layer. Accordingly, since the adhesive power to the porous layer including vapor inorganic particles can be improved, it is possible to suppress and prevent the separation of the porous layer or the anchor layer.

Since the absorption and fixation functions of the ink can be distributed by the two-layered structure, the thickness of each layer can be decreased, and since the boundary is fused at the time of forming the porous layer on the anchor layer, the concentration of the vapor inorganic particles increases toward the surface, thereby further reducing the adhesive power of the surface of the porous layer. When the outer diameter of the porous layer is larger than the outer diameter of the anchor layer, the adhesion between the disks due to the adhesive power of the anchor layer can be prevented and thus the ink absorbing ability can be enhanced by forming the anchor layer having high ink absorbing ability, thereby obtaining high reliability. In addition, when the amount of expansion and contraction of the porous layer goes greater and the amount of expansion and contraction of the anchor layer goes smaller by adding and removing heat or a solvent, the anchor layer serves as a buffer layer to suppress the generation of cracks due to the expansion and contraction after the drying process or the printing process. Furthermore, when the smoothness of the anchor layer, the porous layer goes more transparent as the thickness of the porous layer goes smaller. Accordingly, it is possible to realize a high gloss by securing high smoothness and to accomplish high productivity by decreasing the thickness of the porous layer.

Figure 4:
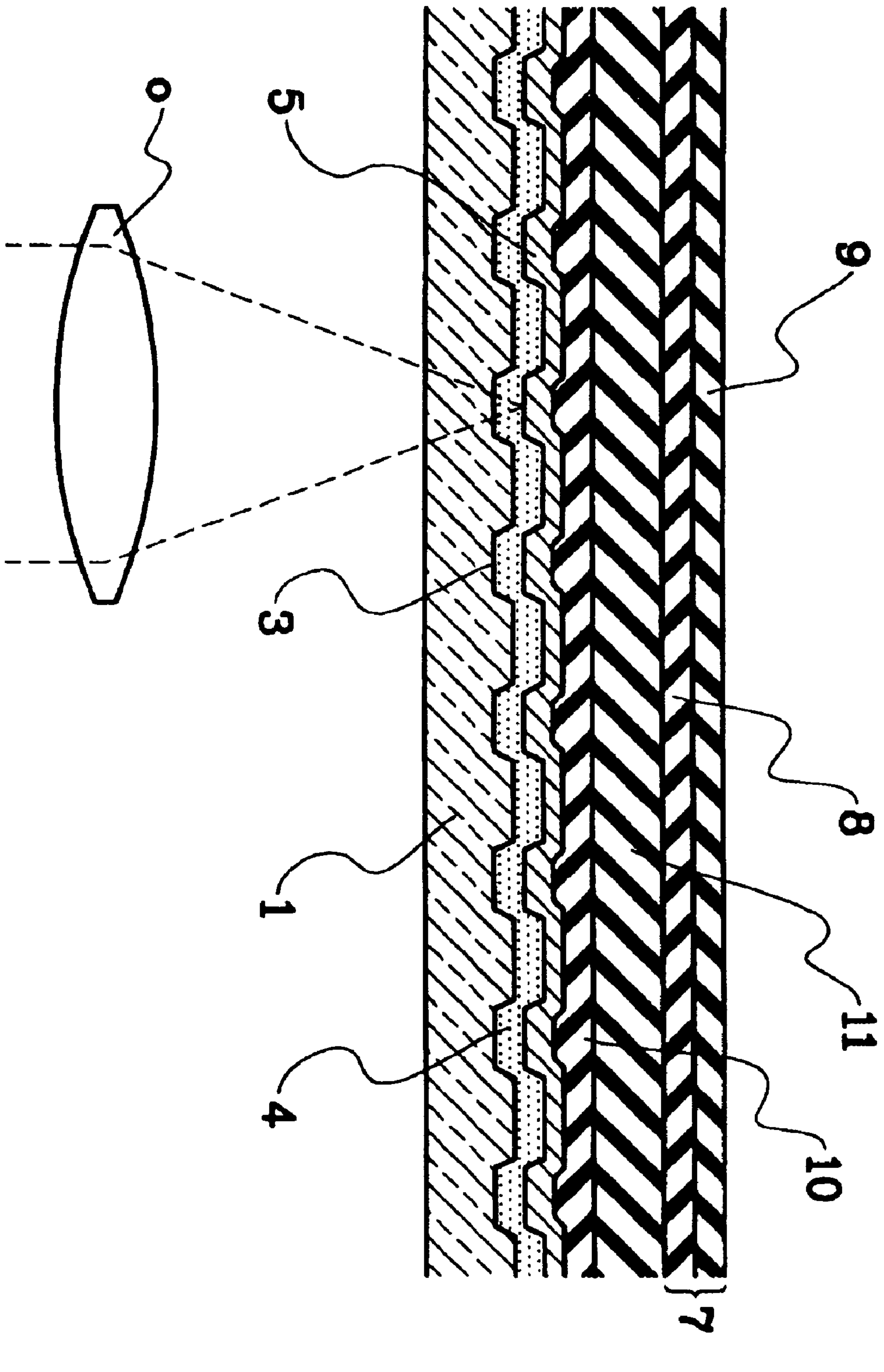
FIG. 4 is a sectional perspective view illustrating an import part of an optical disk as an optical information recording medium according to another embodiment of the invention.

Like CD-R, in the configuration shown in FIGS. 1 to 3, the recording layer 4 and the reflection layer 5 are sequentially formed on the light transmitting substrate 1 and the protection layer 6 is formed on the entire surface of the reflection layer 5 from the inner circumference to the outer circumference of the light transmitting substrate 1. Like DVD-R or DVD+R, FIG. 4 shows a configuration of an optical information recording medium in which the recording layer 4 and the reflection layer 5 are sequentially formed on the light transmitting substrate 1 and another substrate 11 is bonded thereto with a bonding layer 10 therebetween. In the latter, the image forming layer is formed on the surface of the substrate 11 on which recording light and reproduction light is not incident, but the image forming layer may have a one-layered structure of a porous layer or a multi-layered structure of a porous layer and an anchor layer. In any case, a coloring layer may be formed as the lowermost layer as needed. The coloring layer may be formed on the protection layer shown in FIGS. 1 to 3 and the one-layered structure of the porous layer or the multi-layered structure of the porous layer and the anchor layer may be formed on the coloring layer. The anchor layer and the porous layer may be formed in a single layer or in multiple layers. The "image forming layer" may be referred to as an "ink receiving layer." This configuration can apply to an optical information recording medium which is recordable by the use of short-wave laser beams having a wavelength of 360 to 450 nm.

Next, embodiments of the invention will be described in further detail with reference to the attached drawings.

Experimental Embodiment 1

In Experimental Embodiment 1, a two-layered structure of an anchor layer (swelling layer) and a porous layer is employed as an image forming layer of CD-R.

2 parts by weight of a 10 wt % aqueous solution of polyvinyl alcohol (degree of polymerization: 500, degree of saponification: 86 to 90 mol %) and 71 parts by weight of a 6 wt % aqueous solution of polyvinyl alcohol (degree of polymerization: 3,100 to 3,900, degree of saponification: 86 to 90 mol %) are mixed, and 1.5 parts by weight of a 20 wt % aqueous solution of nitric acid and 1.0 parts by weight of a 0.25 parts by weight aqueous solution of zirconium oxychloride-8hydride are added thereto. By adding 24.5 parts by weight of vapor alumina (Alu-C made by Aerosil Co., Ltd.) thereto while shaking and mixing the resultant aqueous solution and dispersing the vapor alumina with a ball mill for a day, a coating solution A is obtained. The viscosity of the coating solution is 3,140 mPa·s at 25° C.

Next, a light transmitting substrate made of poly carbonate with an outer diameter of 120 mmϕ, an inner diameter of 15 mmϕ, and a thickness of 1.2 mm in which groove-shaped tracking guides with a half width of 0.5 μm, a depth of 0.2 μm, and a tracking pitch of 1.6 μm are formed in a diameter range of 46 to 117 mmϕ is prepared.

As shown in FIGS. 1 to 3, the surface of the light transmitting substrate 1 on which the tracking guides 3 are formed is coated with a cyanine pigment melted in a solvent by the use of a spin coating method and is dried, thereby forming the recording layer 4 made of a pigment layer with an average thickness of about 70 nm. Silver is sputtered onto the recording layer, thereby forming the reflection layer 5 with a thickness of 100 nm. The resultant structure is coated with UC-curable resin SD-318 (made by Dainippon Ink and Chemicals Incorporated) by the use of the spin coating method and UV rays are irradiated thereto to cure the resin, thereby forming the protection layer 6 with a thickness of 10 μm. In this way, a so-called CD-R is obtained.

Next, although not shown, a white underlying layer is formed on the entire surface of the protection layer 6 with white ink, wherein the white underlying layer is formed by applying, drying, and curing a coating solution (pigments occupy 44% of the soluble solid) including 28 parts by weight of special acryl-grouped acrylate (made by Nippon Kayaku Co., Ltd.) (UV-curable resin), 20 parts by weight of poly ester-grouped acrylate (made by Toagosei Co., Ltd.) (other binder), 16 parts by weight of synthesized silica (made by Aonogi Co., Ltd.) (pigment), 28 parts by weight of titanium oxide (white pigment), and 8 parts by weight of Irgacure (photopolymerization initiator). Then, a coating solution obtained by dispersing 10 wt % of fillers including silica particles with an average particle diameter of 7 μm in an aqueous solution of 20 wt % polyvinyl pyrrolidone (PVP) is prepared. The prepared coating solution is formed on the underlying layer other than the margin area at the outer circumference by the use of the screen print method. Subsequently, the formed layer is heated and dried at 60° C., thereby forming a hydrophilic anchor layer 8 with a thickness of 15 μm.

Then, the anchor layer 8 is coated with the coating solution A by the use of the spin coating method. Subsequently, the coating layer is heated and dried at 60° C., thereby forming the porous layer 9 (hydrophilic porous layer made of a hydrophilic porous film) with a thickness of 10 μm. As a result, the image forming layer 7 having the two-layered structure of the anchor layer 8 and the porous layer 9 is formed on the white underlying layer formed on the protection layer 6.

In this way, the outer diameter of the porous layer is larger than the outer diameter of the anchor layer to expose the porous layer which can absorb the ink and little leave the ink on the surface thereof. Accordingly, the anchor layer on which solid attachment can more easily occur than the porous layer at the time of application of ink can be covered. Since the anchor layer has a thickness larger than that of the porous layer and is formed by the use of the screen print method, the anchor layer has high smoothness. Since the porous layer is thin and transparent, the porous layer has a gloss. In addition, since the surface portion of the anchor layer is melted and the coating layer is fused in the boundary at the time of application of the coating solution A, the porous layer formed out of the coating layer has a pigment ratio increasing toward the surface and the surface adhesive property is lowered as much.

An image is printed on the surface of the porous layer of the optical disk with aqueous color ink by a Bubble Jet (registered trademark) printer. As a result, a clear image having a clear color is obtained. When a portion of the surface of the porous layer to which the ink is applied is strongly scrubbed with a finger after printing the image, there occurs no blur of the printed image. When a PET film (polyester film) is pressed to the portion of the surface of porous layer to which the ink is applied under the condition with a temperature of 23° C. and a humidity of 85%, the attachment of the film does not occur.

Next, as for the coating solution A, a relation between viscosity and spin coating property and a relation between thickness of the porous layer and image quality have been inspected.

The inspection result of spin coating property with respect to viscosity of the coating solution in accordance with the amount of mixed vapor alumina for forming the porous layer 9 is shown in Table 1 and image quality with respect to thickness of the porous layer 9 formed by the use of the spin coating method is shown in Table 1.

As shown in the tables, when 12 to 26 wt % of vapor alumina is added and the viscosity of the coating solution for forming the porous layer 9 is adjusted in the range of 39.5 to 8,028 mPa·s (25° C.), the spin coating property is good and thus the spin coating method can be used satisfactorily. When the thickness of the porous layer 9 formed by the use of the spin coating method is in the range of 10.9 to 31.4 μm, the image quality is good. When the thickness is in the range of 4.5 to 6.7 μm, slight blur occurs, which is improved in comparison with the blur occurring with the thickness of 0.4 to 3.7 μm.

The outer circumference of the anchor layer 8 is coated with a hydrophobic solution of fluorine group compound by the use of the spin coating method to form a ring-shaped hydrophobic portion, a porous layer is formed on the anchor layer 8 out of a coating solution, which is obtained by diluting the coating solution A with a solvent to have a viscosity of about 200 mPa·s, by the use of the spin coating method. As the result of observing the thickness of the porous layer in a cross-sectional view, the thickness of the inner circumference is about 20 μm and the thickness of the outer circumference corresponding to the ring-shaped hydrophobic portion is about 20 μm. When the porous layer is formed out of the same lowered-viscosity coating solution similarly except that the hydrophobic process is not performed, the thickness of the inner circumference is about 2 μm and the thickness of the outer circumference is about 2 μm.

As the result of measuring the thickness of the porous layer in which the white underlying layer is not formed and the protection layer is not subjected to the hydrophobic process, almost the same result is obtained.

Experimental Embodiment 2

In Experimental Embodiment 2, a one-layered structure of a porous layer is employed as an image forming layer of CD-R.

Similarly to Experimental Embodiment 1 until the white underlying layer is formed on the protection layer, the layers are formed. Then, a porous layer having a thickness of about 20 μm (a porous layer which is a thick coating layer is obtained by using the coating solution having a enhanced viscosity as shown in Table 1) is directly formed on the white underlying layer without forming the anchor layer on the white underlying layer, thereby forming an image forming layer having a single layer of the porous layer.

As the result of printing an image on the surface of the porous layer of the resultant optical disk similarly to Experimental Embodiment 1, a clear image having a clear color is obtained. When a portion of the surface of the porous layer to which the ink is applied is strongly scrubbed with a finger after printing the image, there occurs no blur of the printed image. When a PET film (polyester film) is pressed to the portion of the surface of porous layer to which the ink is applied under the condition with a temperature of 23° C. and a humidity of 85%, the attachment of the film does not occur.

Experimental Embodiment 3

In Experimental Embodiment 3, a two-layered structure of an anchor layer (swelling layer) and a porous layer is employed as an image forming layer of CD-R.

Similarly to Experimental Embodiment 1 until the protection layer is formed, the layers are formed. Then, a coating solution obtained by dispersing 10 wt % of fillers including silica particles with an average particle diameter of 10 μm in a solution in which 10 wt % of carboxy methyl cellulose is melted in dimethylacrylamide is prepared, and the coating solution is printed on the surface of the protection layer by the use of the screen print method. Subsequently, UV rays are irradiated to the coated film to cure the coated film, thereby forming a hydrophilic anchor layer with a thickness of 15 μm.

Next, a coating solution is prepared by dispersing 30 wt % of fillers including silica particles with an average particle diameter of 50 nm in a 5 wt % methylethylketone solution of poly ethylene glycol. The coating solution is printed on the anchor layer by the use of the screen print method. Subsequently, a porous layer made of a porous film with a thickness of about 10 μm is formed by heating and drying the printed layer at 60° C. As a result, an image forming layer having a two-layered structure of the anchor layer and the porous layer is formed on the protection layer.

As the result of printing an image on the surface of the porous layer of the resultant optical disk similarly to Experimental Embodiment 1, a clear image having a clear color is obtained. When a portion of the surface of the porous layer to which the ink is applied is strongly scrubbed with a finger after printing the image, there occurs no blur of the printed image. When a PET film (polyester film) is pressed to the portion of the surface of porous layer to which the ink is applied under the condition with a temperature of 23° C. and a humidity of 85%, the attachment of the film does not occur.

Experimental Embodiment 4

In Experimental Embodiment 4, a one-layered structure of a porous layer is employed as an image forming layer of CD-R.

Similarly to Experimental Embodiment 3 until the protection layer is formed, the layers are formed. Then, a porous layer is directly formed on the protection layer without forming the anchor layer on the protection layer, thereby forming an image forming layer having a single layer of the porous layer.

As the result of printing an image on the surface of the porous layer of the resultant optical disk similarly to Experimental Embodiment 1, a clear image having a clear color is obtained. When a portion of the surface of the porous layer to which the ink is applied is strongly scrubbed with a finger after printing the image, there occurs no blur of the printed image. When a PET film (polyester film) is pressed to the portion of the surface of porous layer to which the ink is applied under the condition with a temperature of 23° C. and a humidity of 85%, the attachment of the film does not occur.

Experimental Embodiment 5

In Experimental Embodiment 5, a two-layered structure of an anchor layer (swelling layer) and a porous layer is employed as an image forming layer of DVD-R.

A light transmitting substrate made of poly carbonate with an outer diameter of 120 mmϕ, an inner diameter of 15 mmϕ, and a thickness of 0.6 mm in which groove-shaped tracking guides with a half width of 0.3 μm, a depth of 0.2 μm, and a tracking pitch of 0.74 μm are formed in a diameter range of 46 to 117 mmϕ is prepared.

As shown in FIG. 4, the surface of the light transmitting substrate 1 on which the tracking guides 3 are formed is coated with a cyanine pigment melted in a solvent by the use of the spin coating method and is dried, thereby forming a recording layer 4 made of a pigment layer with an average thickness of about 50 nm. Silver is sputtered onto the recording layer, thereby forming a reflection layer 5 with a thickness of 100 nm. The resultant structure is coated with UV-curable resin SD-318 (made by Dainippon Ink and Chemicals Incorporated) by the use of the spin coating method and UV rays are irradiated thereto to cure the resin, thereby forming a protection layer 6 with a thickness of 10 μm. A UV-curable resin adhesive is applied to the surface of the protection layer 6, a substrate 11 having the same material and shape is bonded thereto, and then the substrates are bonded to each other by irradiating UV rays to the adhesive through the substrate 11 to cure the adhesive. In this way, a so-called DVD-R is obtained.

Next, similarly to Experimental Embodiment 1 except that the obtained DVD-R is used instead of the CD-R, the white underlying layer, the hydrophilic anchor layer 8, and the porous layer 9 are sequentially formed on the bonded substrate, thereby forming an image forming layer 7 having a two-layered structure of the anchor layer and the porous layer.

As the result of printing an image on the surface of the porous layer of the resultant optical disk similarly to Experimental Embodiment 1, a clear image having a clear color is obtained. When a portion of the surface of the porous layer to which the ink is applied is strongly scrubbed with a finger after printing the image, there occurs no blur of the printed image. When a PET film (polyester film) is pressed to the portion of the surface of porous layer to which the ink is applied under the condition with a temperature of 23° C. and a humidity of 85%, the attachment of the film does not occur.

Experimental Embodiment 6

In Experimental Embodiment 6, a one-layered structure of a porous layer is employed as an image forming layer of DVD-R.

Similarly to Experimental Embodiment 5 until the protection layer is formed, the layers are formed. Then, a porous layer is directly formed on the protection layer without forming the anchor layer on the protection layer, thereby forming an image forming layer having a single layer of the porous layer.

As the result of printing an image on the surface of the porous layer of the resultant optical disk similarly to Experimental Embodiment 1, a clear image having a clear color is obtained. When a portion of the surface of the porous layer to which the ink is applied is strongly scrubbed with a finger after printing the image, there occurs no blur of the printed image. When a PET film (polyester film) is pressed to the portion of the surface of porous layer to which the ink is applied under the condition with a temperature of 23° C. and a humidity of 5%, the attachment of the film does not occur.

Comparative Example 1

2 parts by weight of a 10 wt % aqueous solution of polyvinyl alcohol (degree of polymerization: 500, degree of saponification: 86 to 90 mol %), 50 parts by weight of a 6 wt % aqueous solution of polyvinyl alcohol (degree of polymerization: 3,100 to 3,900, degree of saponification: 86 to 90 mol %), and 30.5 parts by weight of an ion exchange solution are mixed, and 1.5 parts by weight of a 20 wt % aqueous solution of nitric acid and 1.0 parts by weight of a 0.25 wt % aqueous solution of zirconium oxychloride-8hydride are added thereto. By adding 15 parts by weight of vapor alumina (Alu-C made by Aerosil Co., Ltd.) thereto while shaking and mixing the resultant aqueous solution and dispersing the vapor alumina with a ball mill for a day, a coating solution B is obtained. The viscosity of the coating solution is 280 mPa·s at 25° C.

Similarly to Experimental Embodiment 2 except that a porous layer with a thickness of 4 μm is formed out of the coating solution B instead of the coating solution A, an optical disk in which an image forming layer having a single layer of the porous layer is obtained.

As the result of printing an image on the surface of the porous layer of the obtained optical disk similarly to Experimental Embodiment 1, blur occurs on the printed image.

As the result of changing the conditions of the spin coating method to obtain a porous layer with a thickness of 20 μm out of the coating solution B, non-uniform blur appears on the porous layer.

Comparative Example 2

Similarly to Experimental Embodiment 1 until the anchor layer is formed, the layers are formed. Then, without forming the porous layer, an image forming layer having a single layer of the anchor layer is formed.

As the result of printing an image on the surface of the porous layer of the resultant optical disk similarly to Experimental Embodiment 1, a clear image having a clear color is obtained. When a PET film (polyester film) is pressed to the portion of the surface of porous layer to which the ink is applied under the condition with a temperature of 23° C. and a humidity of 85%, the attachment of the film occurs.

Comparative Example 3

Similarly to Experimental Embodiment 6 except that a porous layer is formed out of the coating solution B instead of the coating solution A, an optical disk in which an image forming layer having a single layer of the porous layer is obtained.

As the result of printing an image on the surface of the porous layer of the obtained optical disk similarly to Experimental Embodiment 1, blur occurs on the printed image.

As the result of changing the conditions of the spin coating method to obtain a porous layer with a thickness of 20 μm out of the coating solution B, non-uniform blur appears on the porous layer.

TABLE 1

| | [wt %] Content of Alumina | [wt %] Content of PVA | [mPa · s, 25° C.] Viscosity | Spin coating property | [μm] Thickness | Image quality |
|---|---|---|---|---|---|---|
| 1 | 12 | 2.4 | 39.5 | good | 0.4 | X (blur appears) |
| 2 | 15 | 3 | 187 | good | 1.6 | X (blur appears) |
| 3 | 17.5 | 3.5 | 348 | good | 2.2 | X (blur appears) |
| 4 | 17.5 | 3.5 | 348 | good | 3.7 | X (blur appears) |
| 5 | 17.5 | 3.5 | 348 | Slightly good | 4.5 | Δ (slight blur) |
| 6 | 17.5 | 3.5 | 348 | Bad (non-uniform) | 5.1 | Δ (slight blur) |
| 7 | 20 | 4 | 963 | good | 6.7 | Δ (slight blur) |
| 8 | 20 | 4 | 963 | good | 10.9 | ○ |
| 9 | 20 | 4 | 963 | Bad (non-uniform) | 15.6 | ○ |
| 10 | 22 | 4.4 | 1610 | good | 17.6 | ○ |
| 11 | 24 | 4.8 | 5024 | good | 21.1 | ○ |

TABLE 1-continued

| | [wt %] Content of Alumina | [wt %] Content of PVA | [mPa · s, 25° C.] Viscosity | Spin coating property | [μm] Thickness | Image quality |
|---|---|---|---|---|---|---|
| 12 | 26 | 5.2 | 8028 | good | 24.5 | ○ |
| 13 | 26 | 6.5 | 14460 | Bad (non-uniform) | 31.4 | ○ |

What is claimed is:

1. An optical information recording medium, comprising an image forming layer on one or more layers stacked on a surface of a light transmitting substrate, wherein optically readable signals are recordable by laser beams incident on the other surface of the light transmitting substrate, and wherein the image forming layer comprises an ink absorbing porous layer for absorbing ink and a hydrophilic anchor layer for fixing an image with the ink, wherein the ink absorbing porous layer is formed on and in contact with the hydrophilic anchor layer, the ink absorbing porous layer and the hydrophilic anchor layer are surrounded, as view from above, by a hydrophobic portion formed radially around an outer circumference of the medium, wherein the hydrophobic portion serves as a dam for blocking diffusion of a coating solution for forming the ink absorbing porous layer.

2. The optical information recording medium according to claim 1, wherein the hydrophobic portion constitutes a margin region formed when the hydrophilic anchor layer is formed by the use of a screen print method.

3. The optical information recording medium according to claim 1, wherein the substrate is made of poly carbonate, an inner circumferential edge and an outer circumferential edge of the substrate are non-coated portions, and the hydrophobic portion is formed in the outer circumference and further in the inner circumference.

4. The optical information recording medium according to claim 1, wherein the ink absorbing porous layer has an aqueous ink absorbing property.

5. The optical information recording medium according to claim 1, wherein the hydrophilic anchor layer is made of hydrophilic UV-curable resin.

6. A method of manufacturing an optical information recording medium, comprising forming an image forming layer on one or more layers stacked on a surface of a light transmitting substrate, wherein optically readable signals are recordable by laser beams incident on the other surface of the light transmitting substrate, the image forming layer comprising an ink absorbing porous layer for absorbing ink and a hydrophilic anchor layer for fixing an image with the ink, wherein forming the image forming layer comprises:

forming the hydrophilic anchor layer on the one or more layers stacked on the substrate while forming a hydrophobic portion surrounding the hydrophilic anchor layer, said hydrophobic portion being formed radially around an outer circumference of the medium; and forming the ink absorbing porous layer by forming a film out of a coating solution comprising a hydrophilic resin material using a spin coating method, wherein diffusion of the coating solution is suppressed and prevented by the hydrophobic portion serving as a dam so that the coating solution is returned reversely in the diffusion direction when the coating solution is applied using the spin coating method, thereby forming the porous layer.

7. The method according to claim 6, wherein the viscosity of the coating solution is in the range of 300 to 14,000 mPa·s (25° C.).

8. The method according to claim 6, wherein the thickness of the formed porous layer is in the range of 5 to 100 μm.

9. The optical information recording medium according to claim 1, wherein the one or more layers stacked on the surface includes a protection layer made of UV-curable resin, and the hydrophobic portion is constituted by the protection layer in the outer circumference thereof.

10. The optical information recording medium according to claim 1, wherein the hydrophobic portion is constituted by a hydrophobic coating formed on the outer circumference of the hydrophilic anchor layer.

11. The method according to claim 6, wherein the hydrophilic anchor layer is formed by the use of a screen print method, and the hydrophobic portion is formed as a margin region.

12. The method according to claim 6, wherein the hydrophobic portion is constituted by coating with a hydrophobic material the outer circumference of the hydrophilic anchor layer.

* * * * *